(12) United States Patent
Schurr

(10) Patent No.: US 7,908,933 B2
(45) Date of Patent: Mar. 22, 2011

(54) LOAD GAUGE

(75) Inventor: Michael Schurr, Murrhardt (DE)

(73) Assignee: Soehnle Professional GmbH & Co. KG, Backnang (DE)

( * ) Notice: Subject to any disclaimer, the term of this patent is extended or adjusted under 35 U.S.C. 154(b) by 0 days.

(21) Appl. No.: 12/298,640

(22) PCT Filed: Apr. 26, 2007

(86) PCT No.: PCT/DE2007/000747
§ 371 (c)(1),
(2), (4) Date: Oct. 27, 2008

(87) PCT Pub. No.: WO2007/121740
PCT Pub. Date: Nov. 1, 2007

(65) Prior Publication Data
US 2009/0095090 A1   Apr. 16, 2009

(30) Foreign Application Priority Data

Apr. 26, 2006   (DE) .................. 10 2006 020 051

(51) Int. Cl.
*G01L 1/00* (2006.01)
(52) U.S. Cl. .................................. 73/862.68
(58) Field of Classification Search ........... 73/862.68, 73/782, 862.64, 862.625
See application file for complete search history.

(56) References Cited

U.S. PATENT DOCUMENTS

| | | | |
|---|---|---|---|
| 3,864,614 A | 2/1975 | Olsen | |
| 5,109,701 A | 5/1992 | Jacobsen et al. | |
| 6,762,922 B2 | 7/2004 | Mednikov et al. | |
| 6,950,031 B2 | 9/2005 | Selig et al. | |
| 7,367,228 B2 | 5/2008 | Christoph et al. | |
| 2003/0098686 A1 | 5/2003 | Mednikov et al. | |
| 2004/0092349 A1* | 5/2004 | Iwamoto et al. | 474/109 |
| 2004/0135355 A1 | 7/2004 | Selig et al. | |
| 2006/0081072 A1* | 4/2006 | Park | 73/862.625 |
| 2007/0028703 A1 | 2/2007 | Christoph et al. | |

FOREIGN PATENT DOCUMENTS

| | | |
|---|---|---|
| DE | 4420691 C1 | 1/1996 |
| DE | 199 18 993 A1 | 9/2000 |
| DE | 10120978 A1 | 11/2002 |
| DE | 103 13 021 B3 | 9/2004 |
| DE | 10341334 A1 | 4/2005 |
| WO | WO-02/33227 A1 | 4/2002 |
| WO | WO-02/46704 A1 | 6/2002 |
| WO | WO 02087928 A1 | 11/2002 |
| WO | WO-2004/102370 A2 | 11/2004 |
| WO | WO 2005026677 A1 | 3/2005 |

OTHER PUBLICATIONS

The International Search Report for International Application No. PCT/DE2007/000747, completed Sep. 27, 2007.
The Written Opinion for International Application No. PCT/DE2007/000747, completed Sep. 27, 2007.

* cited by examiner

*Primary Examiner* — Jewel Thompson
(74) *Attorney, Agent, or Firm* — Leydig, Voit & Mayer, Ltd.

(57) ABSTRACT

The invention relates to a load gauge, comprising at least two coils, which are fixed in relation to each other, for detecting the movement and/or the position of an electrically conductive and/or magnetic element that is movable relative to the coils and against the force of a spring device. Each coil is placed in a dedicated electrical measuring circuit.

18 Claims, 2 Drawing Sheets

LOAD GAUGE

FIELD

The invention relates to a load gauge with at least two coils, locally fixed in reference to each other, for detecting the movement and/or the position of an electrically conductive and/or magnetic element arranged movable in reference to the coils against the force of a spring device.

BACKGROUND

DE 103 41 334 A1 discloses a load gauge, particularly for vehicle seats, having an inductive sensor in which the core of a coil is moved in reference to a coil.

DE 44 20 691 discloses a load gauge cell measuring the change of the effective permeability based on the eddy effect and a change of the impedance in a coil caused thereby.

DE 1001 20 978 A1 discloses a device for measuring the weight of a person sitting on a vehicle seat with a load sensor operating according to the eddy current principle. The load sensor is operated such that frequency-analog weighing signals can be created.

SUMMARY

In an embodiment, the present invention provides a load gauge with at least two coils, locally fixed in reference to each other, for detecting at least one of the movement and the position of an element that is at least one of electrically conductive and magnetic. The element is mobile in reference to the coils against the force of a spring device. At least two coils are each allocated to a separate electric measuring circuit.

BRIEF DESCRIPTION OF THE SEVERAL VIEWS OF THE DRAWINGS

In the drawings an embodiment of the invention is shown schematically and is described in the following using the figures, with equivalent elements being marked with the same reference characters. Here it shows.

DETAILED DESCRIPTION

Figure 1:
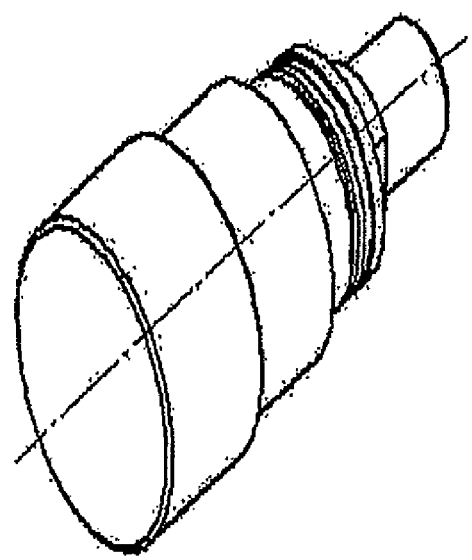
FIG. 1 a load gauge according to the invention in a perspective illustration.
Figure 2:
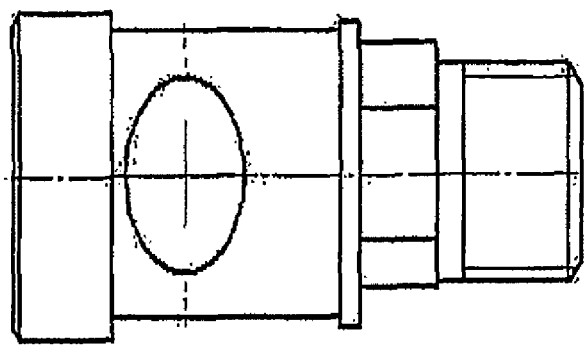
FIG. 2 the load gauge according to the invention in a side view.
Figure 3:
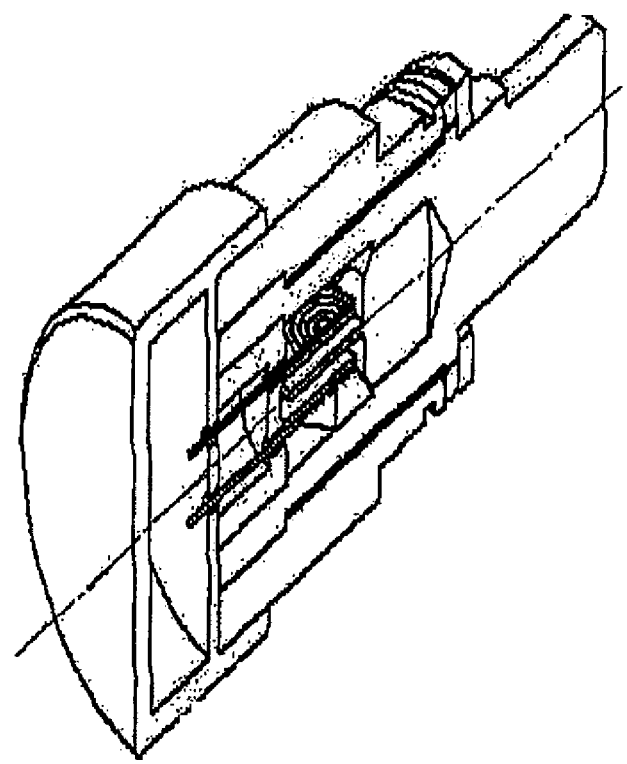
FIG. 3 the load gauge according to the invention in a perspective cross-sectional view.
Figure 4:
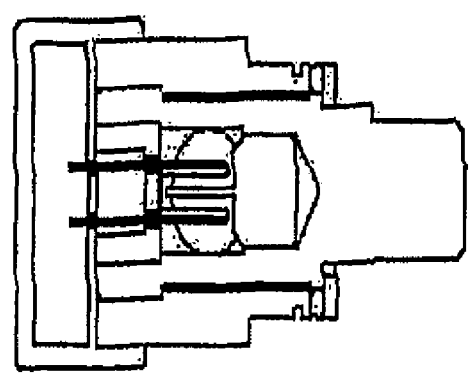
FIG. 4 the load gauge according to the invention in a lateral cross-sectional illustration.

The present invention is a load gauge, particularly operating according to the eddy current principle, with the measurement being of increased precision.

The invention is a load gauge, characterized in that at least two coils are allocated to one separate electric measuring circuit each.

The load gauge according to the invention is advantageous in that a more precise measurement is achieved.

The load gauge according to the invention effectively avoids any mutual influence of the coils.

In an advantageous embodiment, at least one of the coils is embodied as a level coil and/or flat coil and/or helical coil. It may be provided that at least one of the coils is arranged on a circuit board and/or that a circuit arranged on a circuit board forms the coil.

In an advantageous embodiment one of the coils is embodied as an etched flat coil.

In a particularly beneficial embodiment it is provided that the measurement of the movement and/or position of the element first can be performed via a first electric measurement circuit allocated to a coil and subsequently the measurement of the movement and/or the position of the element using a second electric measurement circuit allocated to another coil. This way a mutual influencing of the measurements is effectively avoided.

Preferably the voltages induced in the coils can be read after each other.

In a particularly advantageous embodiment it is provided that a differential measurement is performed.

Preferably alternating current permanently and/or temporarily flows through at least one of the coils.

Preferably, alternating eddy current flows in the element.

In a particularly advantageous embodiment it is provided that the coils are shielded from each other electromagnetically and/or electrostatically. Preferably the coils are shielded from each other by the element electromagnetically and/or electrostatically.

In an advantageous embodiment the element comprises copper, at least partially.

In an advantageous embodiment the element is embodied as a testing coil.

In an advantageous embodiment it is provided that two coils are arranged located opposite each other. Additionally, two additional coils, preferably allocated to another measuring circuit each, are provided opposite each other. Preferably the two additional coils are arranged offset by 90 degrees in reference to the other two coils.

In an advantageous embodiment it is provided that at least two coils each are arranged per carrier.

In an advantageous embodiment it is provided that the carriers and the spring device are jointly produced in one piece. It may also be provided that the element and the spring device are jointly produced in one piece. It may also be provided that the element and the spring device and the carriers are jointly produced in one piece.

In an advantageous embodiment a housing is provided.

In an advantageous embodiment it is provided that the coils are connected to a first sheath in a locally fixed manner. Additionally it is provided that the element is connected to a second sheath in a locally fixed manner. Preferably the first sheath and the second sheath project into each other.

In an advantageous embodiment it is provided that the first sheath and the second sheath form a housing, preferably projecting into each other.

In an advantageous embodiment overload protection is provided. In an advantageous embodiment it is provided that a circular gap between the first sheath and the second sheath defines and/or limits the range of mobility of the coils in reference to the element, particularly for the purpose of overload protection.

In an advantageous embodiment it is provided that between the first sheath and the second sheath a preferably flexible seal is provided, particularly an O-ring.

Advantageously the load gauge includes a rotational part. For example, the spring device and/or the sheaths can be produced as rotary parts.

The load gauge according to the invention can be used particularly advantageously in a motor vehicle seat and/or a motor vehicle, particularly for measuring the weight of a sitting person.

The invention is described with reference to a particular embodiment. However, amendments and modifications can be performed without leaving the range of protection of the claims following.

The invention claimed is:

1. A load gauge with at least two coils, locally fixed in reference to each other, for detecting at least one of the movement and the position of an element that is at least one of electrically conductive and magnetic, the element being mobile in reference to the coils against the force of a spring device, wherein the at least two coils are each allocated to a separate electric measuring circuit.

2. A load gauge according to claim 1, wherein at least one of the coils is at least one of a level coil, flat coil, helical coil,
   arranged on a circuit board, a circuit arranged on a circuit board, and
   an etched flat coil.

3. A load gauge according to claim 1, wherein the measuring of at least one of the movement and the position of the element can first be performed by a first electric measuring circuit allocated to a coil and thereafter the measuring of at least one of the movement and the position of the element can be performed by a second electric measuring circuit allocated to another coil.

4. A load gauge according to claim 1, wherein at least one of: voltages induced in the coils can be read successively and a differential measurement can be performed.

5. A load gauge according to claim 1, wherein the at least two coils are at least one of electromagnetically and electrostatically shielded from each other by the element.

6. A load gauge according to claim 1, wherein the element at least partially comprises copper.

7. A load gauge according to claim 1, wherein the at least two coils are arranged opposite each other and
   wherein two additional coils are arranged opposite each other, with the two additional coils being arranged offset by 90 degrees in reference to the at least two coils.

8. A load gauge according to claim 1, wherein the at least two coils are arranged at one carrier each, with the carriers and the spring device jointly being produced in one piece.

9. A load gauge according to claim 1, wherein the element and the spring device are jointly produced in one piece.

10. A load gauge according to claim 1,
    wherein the coils are connected to a first sheath in a locally fixed manner and wherein the element is connected locally fixed to a second sheath, with the first sheath and the second sheath extending into each other forming a housing.

11. A load gauge according to claim 1, wherein an overload protection is provided.

12. A load gauge according to claim 10, wherein a circular gap between the first sheath and the second sheath defines a range of motion of the coils in reference to the element.

13. A load gauge according to claim 1, further comprising a rotary part.

14. A motor vehicle with a load gauge according to claim 1.

15. A load gauge according to claim 1, wherein alternating current flows at least one of temporarily and permanently through at least one of the coils.

16. A load gauge according to claim 1, wherein an eddy current flows in the element.

17. A load gauge according to claim 10, further comprising a seal between the first sheath and the second sheath.

18. A load gauge according to claim 1, wherein the element is embodied as a test coil.

* * * * *